United States Patent
Lovatini et al.

(10) Patent No.: US 8,275,592 B2
(45) Date of Patent: Sep. 25, 2012

(54) JOINT INVERSION OF TIME DOMAIN CONTROLLED SOURCE ELECTROMAGNETIC (TD-CSEM) DATA AND FURTHER DATA

(75) Inventors: Andrea Lovatini, Milan (IT); Michael D. Watts, Milan (IT); Diego Rovetta, Bergamo (IT); Giancarlo Bernasconi, Malnate (IT); Paolo Mazzucchelli, Gallarate (IT)

(73) Assignee: WesternGeco L.L.C., Houston, TX (US)

( * ) Notice: Subject to any disclaimer, the term of this patent is extended or adjusted under 35 U.S.C. 154(b) by 734 days.

(21) Appl. No.: 12/413,309

(22) Filed: Mar. 27, 2009

(65) Prior Publication Data

US 2009/0254320 A1    Oct. 8, 2009

Related U.S. Application Data

(60) Provisional application No. 61/043,078, filed on Apr. 7, 2008.

(51) Int. Cl.
    *G06G 7/48* (2006.01)
(52) U.S. Cl. ............................................. 703/10; 702/6
(58) Field of Classification Search .................... 703/10; 702/14, 6
    See application file for complete search history.

(56) References Cited

U.S. PATENT DOCUMENTS

| | | | |
|---|---|---|---|
| 7,023,213 B2 | 4/2006 | Nichols | |
| 7,340,348 B2* | 3/2008 | Strack et al. | 702/14 |
| 7,894,989 B2* | 2/2011 | Srnka et al. | 702/2 |
| 2005/0077902 A1* | 4/2005 | MacGregor et al. | 324/334 |
| 2006/0186887 A1 | 8/2006 | Strack et al. | |
| 2006/0186889 A1 | 8/2006 | Andreis | |
| 2006/0203613 A1 | 9/2006 | Thomsen et al. | |

OTHER PUBLICATIONS

Christensen, et al., Special Section-Marine Controlled-Source Electromagnetic Methods 1D Inversion and Resolution Analysis of Marine CSEM Data, Geophysics, Mar.-Apr. 2007, vol. 72, No. 2.
Tarantola, et al., Inverse Problems= Quest for Information, Journal of Geophysics. 1982, pp. 159-170, vol. 50.
PCT Search Report, dated Nov. 24, 2009, Application No. PCT/US2009/039637.

* cited by examiner

*Primary Examiner* — Eunhee Kim

(57) ABSTRACT

To perform inversion based on electromagnetic (EM) data acquired in a subterranean survey, time domain controlled source EM (TD-CSEM) data is acquired by at least one EM receiver in response to EM signals from a controlled EM source. Further data is received, where the further data is selected from among magnetotelluric (MT) data and DC data acquired by the at least one receiver. A probabilistic joint inversion is applied on the TD-CSEM data and the further data to produce a model representing a subterranean structure that is a target of the subterranean survey.

19 Claims, 3 Drawing Sheets

US 8,275,592 B2

JOINT INVERSION OF TIME DOMAIN CONTROLLED SOURCE ELECTROMAGNETIC (TD-CSEM) DATA AND FURTHER DATA

CROSS-REFERENCE TO RELATED APPLICATIONS

This claims the benefit under 35 U.S.C. §119(e) to U.S. Provisional Application Ser. No. 61/043,078, entitled "Probabilistic Joint Inversion of TD-CSEM, MT and DC Data for Hydrocarbon Exploration," filed Apr. 7, 2008, which is hereby incorporated by reference.

TECHNICAL FIELD

The invention relates generally to applying joint inversion on time domain controlled source electromagnetic (TD-CSEM) data and further data (e.g., magnetotelluric (MT) data and/or DC data, and/or frequency domain CSEM) to produce a model representing a subterranean structure.

BACKGROUND

Various electromagnetic techniques exist to perform surveys of subterranean structures underneath a surface for identifying structures of interest. Examples of structures of interest in the subterranean structure include subsurface resistive bodies, such as oil-bearing reservoirs, gas injection zones, and fresh-water aquifers. One survey technique is the controlled source electromagnetic (CSEM) survey technique, in which an electromagnetic (EM) transmitter (typically towed by a sea vessel in a marine environment) is used to generate electromagnetic signals.

Surveying units (or receivers) containing electric and magnetic field sensors are deployed on the sea floor within an area of interest to make measurements (of EM wavefields) from which a geological survey of the subterranean structure underneath the surface can be derived. Through the use of the CSEM technique, a high-resolution mapping of changes in resistivity associated with the presence of oil and hydrocarbon is possible. Measurements taken by the EM receivers are interpreted in such a way that a prediction of the presence and location of oil and hydrocarbon in the sedimentary layers of the subterranean structure can be made.

One type of CSEM survey acquisition technique is a time domain (or transient) CSEM survey acquisition technique. With time domain CSEM (or TD-CSEM), a controlled EM source is turned on and then turned off after a desired waveform is transmitted (e.g., a pulse or step function, for example). A transient decay of the EM field, or an impulsive response of the EM field, as detected by EM receivers, is observed.

Inversion can be applied to the TD-CSEM data as acquired by the EM receivers to produce a model of a subterranean structure that is the subject of the CSEM survey. However, conventional inversion techniques that are applied to TD-CSEM data may not produce accurate models.

SUMMARY

In general, according to an embodiment, a method of processing electromagnetic (EM) data acquired in the subterranean survey includes receiving time domain controlled source EM (TD-CSEM) data acquired by at least one EM receiver in response to EM signals from a controlled EM source. Moreover, further data is received, where the further data is selected from among magnetotelluric (MT) data and/or DC data acquired by the at least one receiver. Probabilistic joint inversion is then applied on the TD-CSEM data and further data to produce a model representing a subterranean structure that is a target of the subterranean survey.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a probabilistic joint inversion technique is provided to jointly invert time domain (or transient) controlled source electromagnetic (TD-CSEM) data with other data, including magnetotelluric (MT) data and/or DC data. CSEM data refers to EM data (magnetic and/or electric field data) acquired by one or more EM receivers in response to EM signals from a controlled EM source. The EM signals from the controlled EM source are propagated into a subterranean structure. The EM signals, as affected by the subterranean structure, are detected by the one or more EM receivers, which can record the detected EM data. TD-CSEM data refers to a technique in which the controlled EM source is turned on for some time interval to produce source EM signals within a particular time window. The source EM signal can be a pulse, a step function, or some other type of signal. The EM data detected by the one or more EM receivers would include either a transient decay behavior or an impulsive response behavior.

Inversion refers to an algorithm in which EM data is used to generate a model that represents the subterranean structure. Joint inversion refers to an algorithm that generates a model based on multiple different types of observed data, including TD-CSEM data and MT data and/or DC data. Probabilistic joint inversion refers to an inversion algorithm that uses probability densities, described further below.

MT data refers to EM data detected by one or more EM receivers in response to naturally occurring EM fields. In accordance with some embodiments, using the same one or more EM receivers, the MT data and TD-CSEM data can be acquired at different times, with the MT data acquired when the controlled EM source is turned off.

DC data refers to voltage, current, or resistivity information that can also be measured by sensing elements in the EM receivers. DC data represents the background electrical characteristics of the subterranean structure.

Acquisition of survey EM data can be performed in either a land-based environment or a marine environment. In a land-based environment, EM receivers can be placed on an earth surface, and a recording truck can be connected to the EM receivers for receiving data measured by the EM receivers. One or more controlled EM sources can also be positioned at various locations, with the controlled EM sources activated to produce EM signals that are propagated into a subterranean structure.

In a marine acquisition context, EM receivers can be placed on a water bottom surface (e.g., sea floor), and a marine vessel can be used to tow one or more controlled EM sources.

Figure 1:
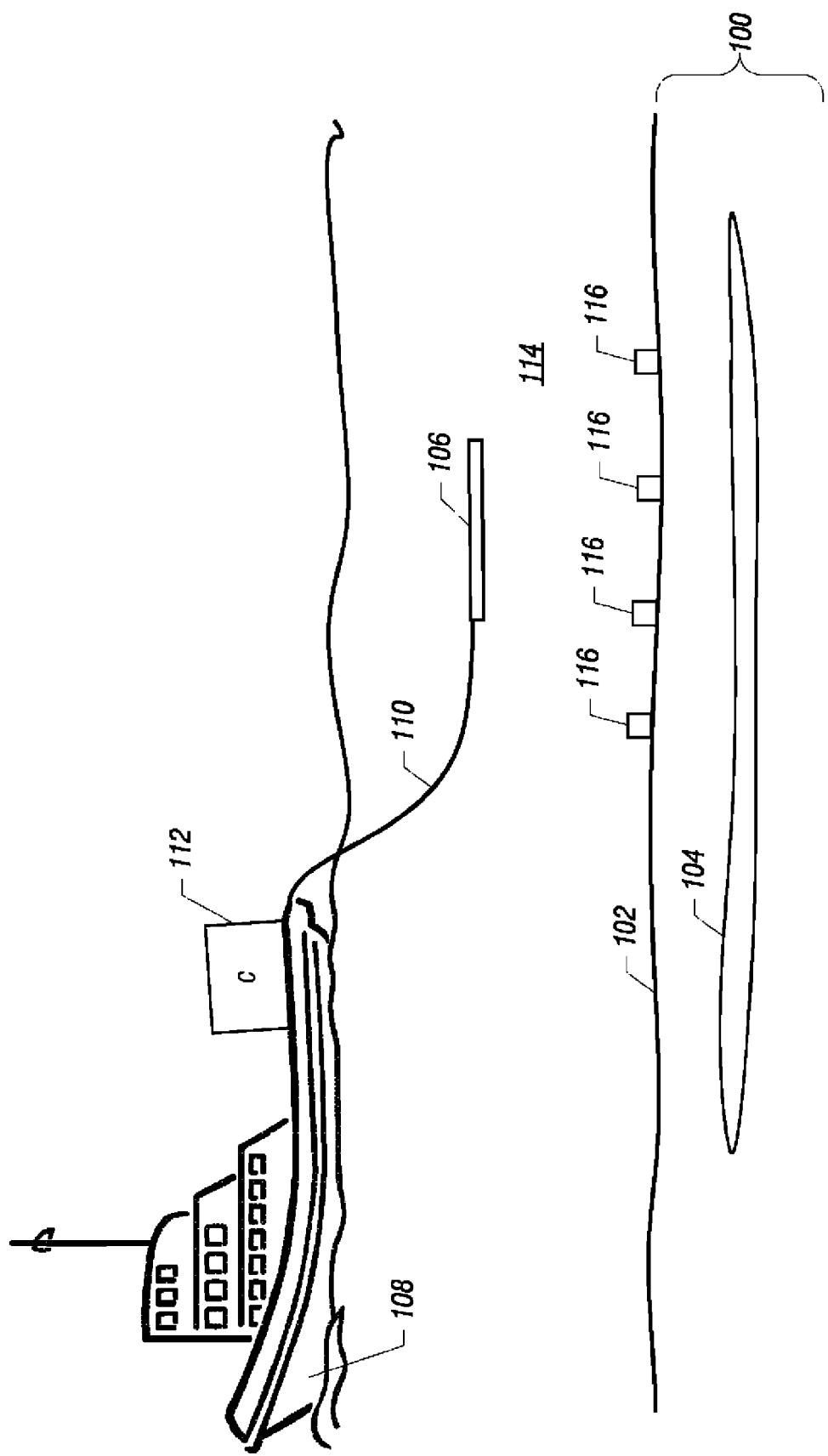
FIG. 1 illustrates an exemplary survey arrangement for acquiring electromagnetic (EM) data that has been affected by a subterranean structure, where the EM data includes at least time domain controlled source EM (TD-CSEM) data and magnetotelluric (MT) data and/or DC data, in accordance with an embodiment.

FIG. 1 illustrates an exemplary arrangement for performing a survey of a subterranean structure in a marine environment. As depicted in FIG. 1, EM surveying is performed of a subterranean structure 100 that is located below a water bottom surface 102 (e.g., sea floor). The subterranean structure 100 includes one or more subterranean elements 104 of interest, where the one or more subterranean elements can include a hydrocarbon-bearing reservoir, gas injection zone, fresh-water aquifer, or other elements of interest.

A controlled EM source 106 is towed by a marine vessel 108 by a tow cable 110. A controller 112 on the marine vessel can send control signals to the controlled source 106 to activate the controlled EM source 106 to emit EM fields that are propagated through a body of water 114 into the subterranean structure 100.

A line or array of EM receivers 116 are provided on the water bottom surface 102, where the EM receivers 116 are able to detect EM fields affected by the subterranean structure 100. The EM receivers 116 include sensing elements for sensing magnetic and/or electric fields.

Typically, the EM receivers 116 include storage devices for storing measured EM data. The stored data can later be processed for determining characteristics of the subterranean structure 100. For example, the EM data measured by the EM receivers 116 can be processed by applying a probabilistic joint inversion algorithm in accordance with some embodiments, where the joint inversion algorithm is applied on the TD-CSEM data acquired by the EM receivers 116, as well as MT data and/or DC data detected by the EM receivers 116.

In an alternative implementation, the EM receivers 116 can be towed on a cable attached to the marine vessel 108. In such a configuration, it may be possible for the EM receivers 116 to include communications transceivers for sending measured data to the controller 112 for processing by the controller 112. Such an arrangement would be considered a "real-time" arrangement.

The probabilistic joint inversion algorithm according to some embodiments that can be applied on different types of measurement data (e.g., TD-CSEM data, MT data, and DC resistivity data) exploits the different and complementary sensitivities of such different measurement data. The algorithm can solve for both background resistivity distribution and resistivity/conductivity anomalies. In some embodiments, a probabilistic approach is used for the solution of the inversion. The probabilistic approach, in which all, or most of, the available information of data and model can be injected in the inversion process, allows one to achieve an accurate inversion. In this case, if MT and/or DC data are available, it is possible to solve the problem with good accuracy by using a joint inversion of TD-CSEM data and MT data, and possibly DC data.

In some embodiments, the model that is to be produced by the probabilistic joint inversion algorithm is parameterized as the vertical resistivities of a one-dimensional (1D) layered medium with fixed values for the thickness of the layers. In other words, the subterranean structure (e.g., 100 in FIG. 1) to be modeled is represented as a stack of layers associated with respective resistivities. In different embodiments, the model can be extended to two-dimensional (2D) or three-dimensional (3D) representations of the subterranean structure.

The model space M contains the resistivity vector: $m=\{\rho_{v1}, \rho_{v2}, \ldots, \rho_{vL}\}$, with L being the number of the layers in the subterranean structure 100, and $\rho_{vj}$, j=1 to L represents the resistivity in layer j. The state of information on model parameters can be described by the prior probability density $\rho_M(m)$, which represents a function of a continuous variable (in this case resistivity calculated from the model m) whose integral over an interval gives the possibility that the value of the variable (resistivity) will fall within the interval. The prior probability density $\rho_M(m)$ is based on prior model parameters, as represented by m, and represents uncertainties of the model parameters. Note that the probabilistic joint inversion algorithm is an iterative algorithm that iteratively produces more accurate representations of the model m as the algorithm progresses.

Data space D contains the acquired TD-CSEM, MT, and/or DC data (detected by EM receivers 116 in FIG. 1). The TD-CSEM data includes an amplitude of an EM field transient (the EM field amplitude decays over time), and the derivative of the EM field transient with respect to the time for different separations between the source 106 and each receiver 116. The relative weight between the transient data and its derivative is a tunable parameter. A first weight is applied to the transient data and a second weight is applied to the derivative of the EM field transient. The tunable parameter specifies the ratio of the first weight and second weight.

The MT data includes complex impedances, measured for different time periods. The MT data includes the response detected by an EM receiver based on measurements of naturally occurring magnetic and electric fields.

DC data includes apparent resistivities for different separations between the transmitter and the receiver. The DC resistivity is measured by causing current to flow in the subterranean structure and measuring the resultant voltage drop across spaced-apart electrodes, or measuring the magnetic fields produced by the current.

An actual observed response is a point in the data space represented by $d_{obs}$, containing all the data (TD-CSEM, MT, and/or DC) that is to be jointly inverted. The prior information on the observed data is expressed by a probability density, denoted by $\rho_D(d)$. The probability density $\rho_D(d)$ represents a function of a continuous variable (TD-CSEM, MT, and/or DC observed noisy data) whose integral over an interval gives the possibility that the value of the variable (actual TD-CSEM, MT, and/or DC observed data without noise) will fall within the interval (note that $\rho_D$ and $\rho_M$ do not stand for resistivity). The probability density $\rho_D(d)$ describes the uncertainty of the acquisition procedure and the data noise. The prior information on model parameters and observations can be defined by the joint probability density $\rho(d,m)$, over the space D×M. If the two spaces D and M are independent, then $\rho(d,m)=\rho_M(m)\rho_D(d)$.

The homogeneous probability density is expressed as follows:

$$\mu(d, m) = \lim_{dispersions \to \infty} \rho(d, m) = \mu_D(d)\mu_M(m).$$

The homogeneous probability density represents the joint probability density $\rho(d,m)$ when there is no prior information about the model and the data, which is when the variance of $\rho(d,m)$ is infinite (the probability density becomes homogeneous). It is necessary to normalize the following Eq. 1 so that the result will be a probability density.

The information on the physical correlations between observable parameters and model parameters is called a theoretical probability density, defined over the space D×M, as $\Phi(d,m) = \Phi(d|m)\mu_M(m)$, where $\Phi(d|m)$ is a probability density, and $\mu_M(m)$ is the model homogeneous probability density. The forward model, denoted as d=g(m), where g is a generally nonlinear vectorial function, is the link between model and data parameters. The function g is used to predict, for a given set of model parameters m∈M, the values of the observable parameters, d∈D. The forward model can contain approximations, and the approximations are described by the probability density $\Phi(d|m)$, resulting in uncertainties in the modeling. In some embodiments, multiple forward models are used, corresponding respectively to the models of TD-CSEM, MT, and/or DC soundings.

In the probabilistic framework, the solution of the inverse problem is described by a posterior probability density combining the prior information ρ(d,m) (relating to two or more of TD-CSEM data, MT data, and DC data), with the theoretical information obtained from the forward model $\Phi(d,m)$ (containing two or more of the TD-CSEM model, MT model, and DC model) and normalized by the homogeneous probability density:

$$\sigma(d, m) = \frac{k\rho(d, m)\Phi(d, m)}{\mu(d, m)}, \quad (Eq.\ 1)$$

where k is a normalization constant. The marginal probability in the model space is:

$$\sigma_M(m) = \int_D \sigma(d, m)dd. \quad (Eq.\ 2)$$

$\sigma_M(m)$ is the solution of the inverse problem, and it depicts also the uncertainties of the inverted model parameters. Prior uncertainties are modeled with Gaussian probabilities. In this case, the solution can be simplified to:

$$\sigma_M(m) = k\ \exp\left\{-\frac{1}{2}[(g(m) - d_{obs})^T C_d^{-1}(g(m) - d_{obs}) + (m - m_{priori})^T C_M^{-1}(m - m_{priori})]\right\}, \quad (Eq.\ 3)$$

where $m_{priori}$ represents the a priori model (the model constructed using the knowledge of a user), $C_d = C_D + C_T$ is the covariance matrix that takes into account the uncertainties due to both the measurements and the modeling, and $C_M$ is the covariance matrix that takes into account the uncertainties of the prior model. The solution is obtained by maximizing the posterior probability density $\sigma_M(m)$ of the model, which is equivalent to minimizing the argument of the exponential in Eq. 3. An iterative procedure is used that linearizes the forward model around the current model $m_k$ and obtains a new model $m_{k+1}$ using the Jacobian matrix $G_k$ of the derivatives of the forward model equation with respect to the current model parameters.

The iterative algorithm stops when:

$$|m_{i,k+1} - m_{i,k}| < \epsilon, \forall i = 1, \ldots, L, \quad (Eq.\ 4)$$

where ϵ is a predefined value that specifies a stopping criterion. In other words, if the current model values differ from the previous model values by less than ϵ, then no further iterations have to be performed, and the current model $m_k$ is the optimal solution. A posterior covariance matrix of the model space, $C_{M,post}$, is then computed which describes the uncertainty of the solution:

$$C_{M,post} = (G_k^T C_d^{-1} G_k + C_M^{-1})^{-1}. \quad (Eq.\ 5)$$

Further details can be found in Albert Tarantola, Inverse Problem Theory, SIAM (2005).

The above has described a probabilistic joint inversion algorithm that applies inversion on TD-CSEM data in combination with at least one other type of data: MT data or DC data. The MT data and/or DC data provides valuable information regarding background resistivity of the subterranean structure that is being modeled. The probabilistic joint inversion algorithm makes use of probability densities and forward models that relate to multiple different types of data (TD-CSEM data, MT data, and/or DC data). The term "probabilistic" in the context of the probabilistic joint inversion algorithm refers to the fact that the probability densities (e.g., $\rho_D(d)$ and $\rho_M(m)$) indicate uncertainties of observed data and model parameters, respectively. Probabilistic joint conversion takes advantage of the fact that different acquisition techniques respond differently to model parameters, allowing for extraction of a more complete image of the subterranean structure.

Figure 2:
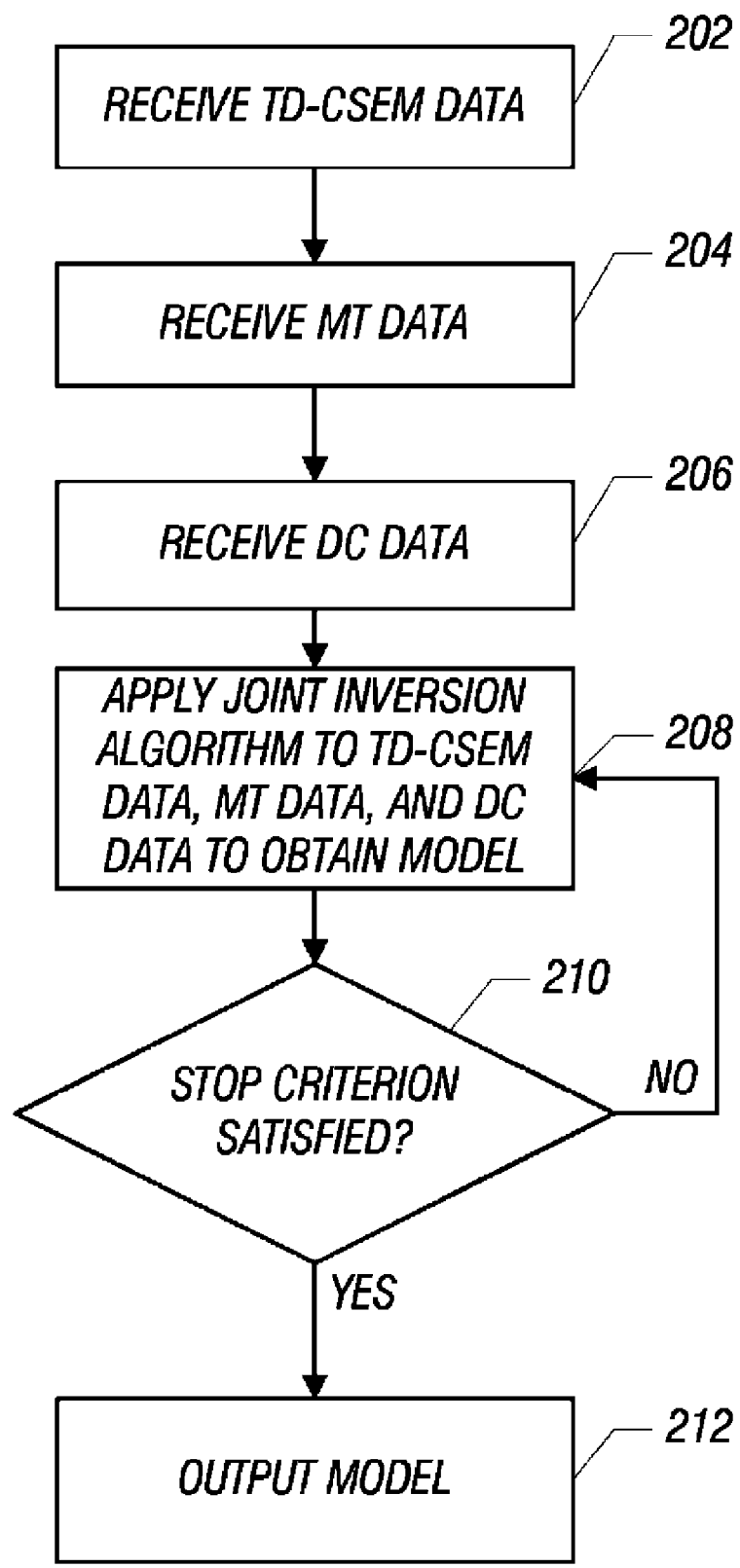
FIG. 2 is a flow diagram of a procedure for applying probabilistic joint inversion on the TD-CSEM data in combination with other data, including MT data and/or DC data, in accordance with an embodiment.

A procedure according to some embodiments is depicted in the flow diagram of FIG. 2. The procedure receives (at 202) TD-CSEM, which was acquired by the EM receivers 116 of FIG. 1. Also, the procedure receives (at 204) MT data, and receives (at 206) DC data. Again, the MT data and DC data can be collected by the EM receivers 116 of FIG. 1. It is noted that the receipt of the different data at 202, 204, 206 can be performed in any order. Also, in some embodiments, just one of the MT data and DC data is received.

Next, a probabilistic joint inversion algorithm as described above is applied (at 208) to the TD-CSEM data, MT data, and/or DC data to obtain a model. The procedure next checks (at 210) whether a stopping criterion has been satisfied. Determining whether a stopping criterion has been satisfied may involve comparing the present model with a previous model, and determining whether the difference between the models is less than a threshold (e.g., C in Eq. 4 above). If the stopping criterion has not been satisfied, then the probabilistic joint inversion algorithm is repeated to obtain another model. The tasks 208 and 210 are iteratively performed until the stopping criterion has been satisfied. When the stopping criterion is satisfied, the resulting model is output (at 212).

Figure 3:
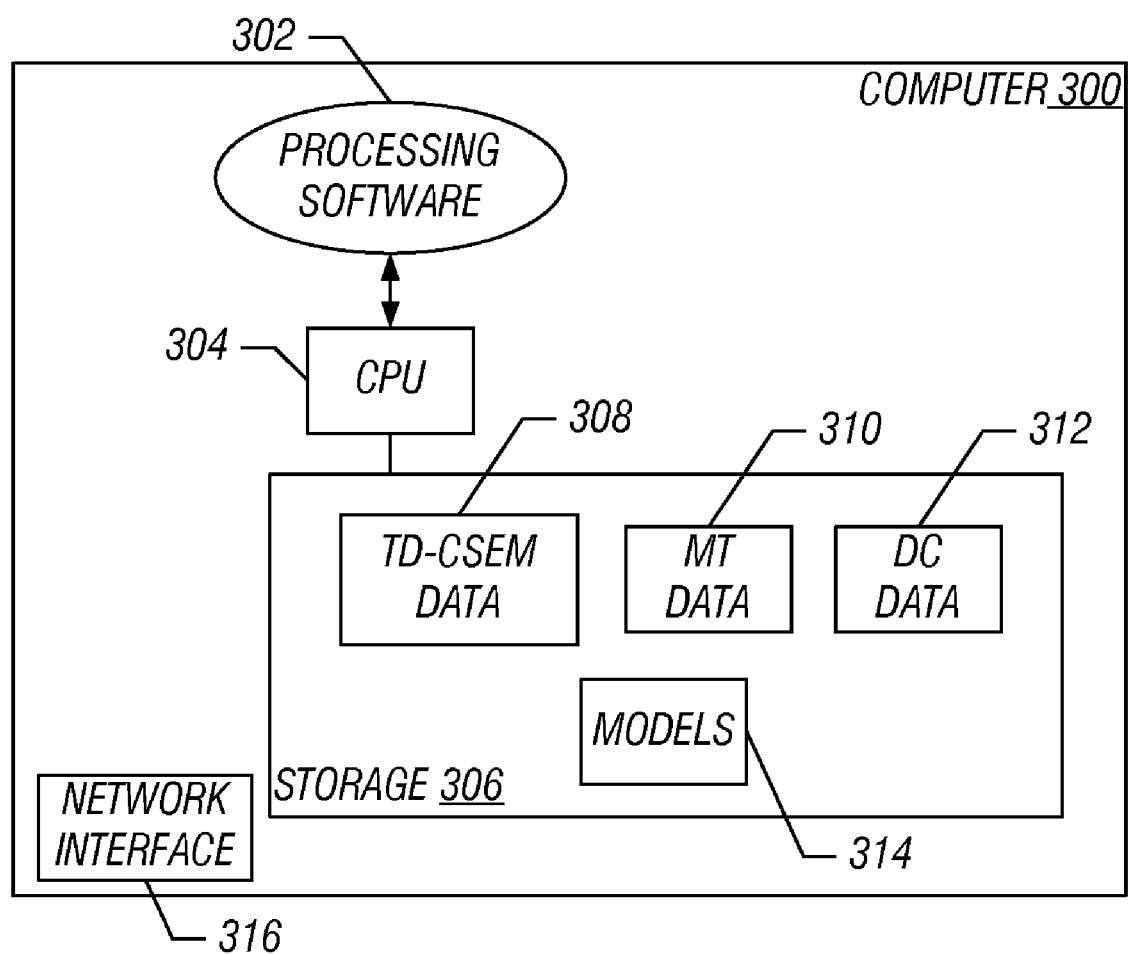
FIG. 3 is a block diagram of an exemplary computer that incorporates processing software for performing a procedure according to an embodiment.

The procedure of FIG. 2 can be performed by processing software 302 (as depicted in FIG. 3) that is executable on one or more central processing units 304. The CPU(s) 304 is (are) connected to a storage 306, which can store measurement data such as the TD-CSEM data 308, MT data 310, and DC data 312. Models 314 produced by the processing software 302 can also be stored in the storage 306.

The computer 300 further includes a network interface 316 to allow the computer 300 to communicate over a network (not shown). For example, the computer 300 can use the network interface 316 to send a model (314) that has been generated using techniques according to some embodiments to a remote entity.

Instructions of the processing software 302 are loaded for execution on a processor (such as one or more CPUs 304). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of performing inversion based on electromagnetic (EM) data acquired in a subterranean survey, comprising:
    receiving time domain controlled source EM (TD-CSEM) data acquired by at least one EM receiver in response to EM signals from a controlled EM source;
    receiving further data including at least one member selected from the group consisting of magnetotelluric (MT) data and DC data; and
    applying probabilistic joint inversion on the TD-CSEM data and the further data to produce a model representing a subterranean structure that is a target of the subterranean survey, wherein applying the probabilistic joint inversion uses probability information that represents uncertainty of at least one member selected from the group consisting of observed data and model parameters.

2. The method of claim 1, wherein the probabilistic joint inversion is applied on the TD-CSEM data and DC data.

3. The method of claim 1, wherein the probabilistic joint inversion is applied on the TD-CSEM data and MT data.

4. The method of claim 1, wherein the probabilistic joint inversion is applied on the TD-CSEM data, MT data, and DC data.

5. The method of claim 1, wherein applying the probabilistic joint inversion is performed iteratively until a stopping criterion is satisfied.

6. The method of claim 5, wherein repeated iterative performance of the probabilistic joint inversion produces corresponding solutions for the model, the method further comprising determining if the stopping criterion is satisfied based on comparing a current solution of the model with a prior solution of the model.

7. The method of claim 1, wherein the probability information includes at least one probability density that represents uncertainty of at least one member selected group from the group consisting of the observed data and the model parameters, wherein the observed data includes at least the TD-CSEM data.

8. The method of claim 1, wherein the probability information includes a probability density that represents uncertainty of the observed data and a probability density that represents uncertainty of the model parameters, wherein the observed data includes at least the TD-CSEM data.

9. The method of claim 8, wherein applying the probabilistic joint inversion further comprises representing a solution of an inverse problem of the probabilistic joint inversion using a posterior probability density that combines the probability densities with information obtained from a forward model representing the subterranean structure.

10. The method of claim 1, wherein producing the model comprises producing a one-dimensional model.

11. The method of claim 1, wherein producing the model comprises producing a two-dimensional model or three-dimensional model.

12. An article comprising at least one non-transitory storage medium containing instructions that, when executed, cause a computer to:
    receive time domain controlled source electromagnetic (TD-CSEM) data acquired by at least one EM receiver in response to EM signals from a controlled EM source;
    receive further data including at least one member selected from the group consisting of magnetotelluric (MT) data and DC data; and
    apply probabilistic joint inversion on the TD-CSEM data and the further data to produce a model representing a subterranean structure that is a target of a subterranean survey, wherein the probabilistic joint inversion uses a first probability density that represents uncertainties associated with observed data including at least the TD-CSEM data.

13. The article of claim 12, wherein applying the probabilistic joint inversion is performed iteratively until a stopping criterion is satisfied.

14. The article of claim 12, wherein applying the probabilistic joint inversion comprises applying the probabilistic joint inversion that further uses a second probability density that represents uncertainties associated with parameters of the model.

15. The article of claim 12, wherein the model comprises one of a one-dimensional model, a two-dimensional model, and a three-dimensional model.

16. A computer comprising:
    a processor; and
    processing software executable on the processor to:
        receive electromagnetic (EM) data acquired by at least one EM receiver in response to EM signals from a controlled EM source;
        receive further data including at least one member selected from the group consisting of magnetotelluric (MT) data and DC data; and
        apply probabilistic joint inversion on the TD-CSEM data and the further data to produce a model representing a subterranean structure that is a target of a subterranean survey, wherein applying the probabilistic joint inversion uses probability information that represents uncertainty of at least one member selected from the group consisting of observed data and model parameters.

17. The computer of claim 16, wherein the received EM data comprises time-domain controlled source EM data.

18. The computer of claim 16, wherein the probability information includes probability densities that represent uncertainties associated with parameters of the model and observed data including at least the EM data.

19. The computer of claim 18, wherein the probabilistic joint inversion comprises representing a solution of an inverse problem of the probabilistic joint inversion using a posterior probability density that combines the probability densities with information obtained from a forward model representing the subterranean structure.

* * * * *